(12) United States Patent
Sekimura et al.

(10) Patent No.: US 9,168,675 B2
(45) Date of Patent: Oct. 27, 2015

(54) METHOD FOR PRODUCING RESIN COMPOSITION

(71) Applicant: Sumitomo Chemical Company, Limited, Tokyo (JP)

(72) Inventors: Satoshi Sekimura, Tokyo (JP); Hiroshi Harada, Singapore (SG)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/374,290

(22) PCT Filed: Dec. 28, 2012

(86) PCT No.: PCT/JP2012/084195
§ 371 (c)(1),
(2) Date: Jul. 24, 2014

(87) PCT Pub. No.: WO2013/114787
PCT Pub. Date: Aug. 8, 2013

(65) Prior Publication Data
US 2014/0371389 A1   Dec. 18, 2014

(30) Foreign Application Priority Data
Jan. 30, 2012  (JP) .................................. 2012-017282

(51) Int. Cl.
| | |
|---|---|
| *C08G 64/00* | (2006.01) |
| *B29B 7/00* | (2006.01) |
| *B29B 7/90* | (2006.01) |
| *B29B 7/48* | (2006.01) |
| *C08J 5/04* | (2006.01) |
| *B29C 47/38* | (2006.01) |
| *B29C 47/60* | (2006.01) |
| *C08K 7/14* | (2006.01) |
| *B29C 47/10* | (2006.01) |
| *C08G 63/02* | (2006.01) |
| *B29B 7/84* | (2006.01) |
| *B29B 7/86* | (2006.01) |
| *G02B 1/04* | (2006.01) |
| *B29K 67/00* | (2006.01) |
| *B29B 9/06* | (2006.01) |
| *B29B 9/12* | (2006.01) |
| *B29B 9/14* | (2006.01) |

(52) U.S. Cl.
CPC ............. *B29B 7/002* (2013.01); *B29B 7/482* (2013.01); *B29B 7/90* (2013.01); *B29C 47/1081* (2013.01); *B29C 47/38* (2013.01); *B29C 47/6062* (2013.01); *C08J 5/044* (2013.01); *C08K 7/14* (2013.01); *B29B 7/845* (2013.01); *B29B 7/86* (2013.01); *B29B 9/06* (2013.01); *B29B 9/12* (2013.01); *B29B 9/14* (2013.01); *B29C 2947/92209* (2013.01); *B29C 2947/92704* (2013.01); *B29C 2947/92895* (2013.01); *B29K 2067/00* (2013.01); *G02B 1/043* (2013.01)

(58) Field of Classification Search
USPC .................. 528/190, 193, 194; 524/494, 602; 366/76.1
See application file for complete search history.

(56) References Cited

U.S. PATENT DOCUMENTS

| | | | |
|---|---|---|---|
| 6,346,568 B1 * | 2/2002 | Maeda et al. ................. | 524/495 |
| 2002/0017631 A1 | 2/2002 | Maeda et al. | |
| 2006/0022378 A1 | 2/2006 | Fukatsu et al. | |
| 2007/0194478 A1 | 8/2007 | Aoki et al. | |
| 2010/0053972 A1 * | 3/2010 | Nakayama ............... | 362/296.01 |

FOREIGN PATENT DOCUMENTS

| | | |
|---|---|---|
| CN | 1942296 A | 4/2007 |
| JP | H06-240114 A | 8/1994 |
| JP | 2000-026743 A | 1/2000 |
| JP | 2001-026701 A | 1/2001 |
| JP | 2001-288342 A | 10/2001 |
| JP | 2006-035677 A | 2/2006 |
| WO | 2005099984 A1 | 10/2005 |
| WO | 2006123824 A1 | 11/2006 |

OTHER PUBLICATIONS

Int'l Search Report issued Apr. 2, 2013 in Int'l Application No. PCT/JP2012/084195.
Int'l Search Report issued Apr. 2, 2014 in Int'l Application No. PCT/JP2012/084195.
Koide, "Liquid Crystalline Polymer Synthesis Molding Applications," CMC, p. 95 (Jun. 5, 1987).
Office Action issued May 26, 2015 in JP Application No. 2012-017282.
Office Action issued Jul. 28, 2015 in CN Application No. 201280067644.1.

* cited by examiner

*Primary Examiner* — Terressa Boykin
(74) *Attorney, Agent, or Firm* — Panitch Schwarze Belisario & Nadel LLP

(57) ABSTRACT

A method for producing a resin composition using an extruder, the extruder having a cylinder and a screw disposed inside the cylinder, the cylinder being provided with a main feed port and further optionally provided with a side feed port disposed downstream in an extrusion direction from the main feed port, and the method comprising: supplying a resin (A) in the total amount to the extruder from the main feed port; supplying a fibrous filler (B), whose a weight average fiber length is 1 mm or more, in the total amount to the extruder from the main feed port, or, with the extruder being provided with the side feed port, supplying the fibrous filler (B) partly to the extruder from the main feed port and the remainder to the extruder from the side feed port; melt-kneading the supplied resin (A) and the fibrous filler (B); and extruding the melt-kneaded material.

4 Claims, 1 Drawing Sheet

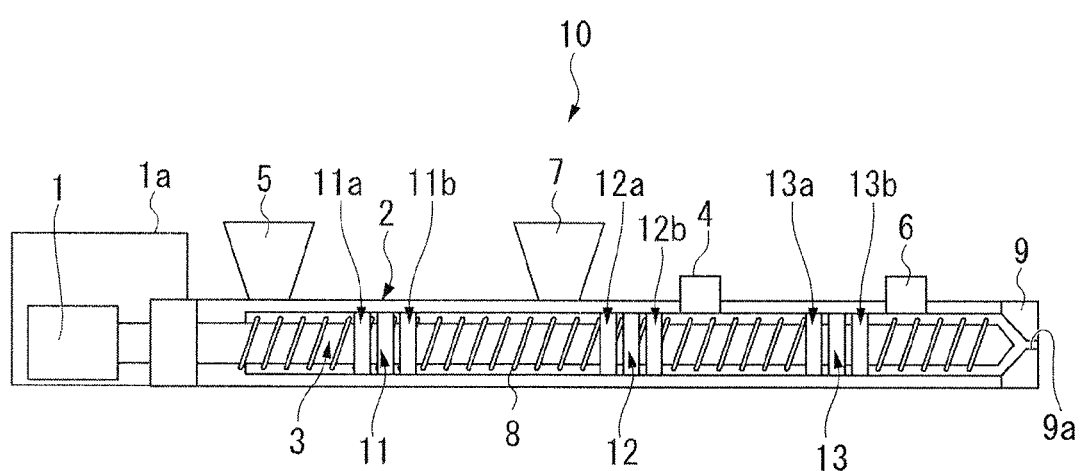

METHOD FOR PRODUCING RESIN COMPOSITION

CROSS-REFERENCE TO RELATED APPLICATION

This application is a Section 371 of International Application No. PCT/JP2012/084195, filed Dec. 28, 2012, which was published in the Japanese language on Aug. 8, 2013, under International Publication No. WO 2013/114787 A1, and the disclosure of which is incorporated herein by reference.

TECHNICAL FIELD

The present invention relates to a method of manufacturing a resin composition.

Priority is claimed on Japanese Patent Application No. 2012-017282, filed Jan. 30, 2012, the content of which is incorporated herein by reference.

BACKGROUND ART

Among resins, liquid crystalline polyesters exhibit favorable molding processability, have high levels of heat resistance and strength, and provide excellent insulating properties, and are therefore used as materials for electrical and electronic components and optical components.

With liquid crystalline polyesters, the molecular chains align readily along the flow direction during molding, and anisotropy tends to develop in the molding shrinkage rate and the mechanical properties between the flow direction and the direction perpendicular thereto. As a result, in order to reduce this anisotropy, fillers of various shapes, including fibrous fillers and plate-like fillers, are mixed into the resin.

On the other hand, when a fibrous filler is mixed with a liquid crystalline polyester, in order to obtain the desired levels of fluidity, moldability and molded article strength, it is preferable that the average fiber length of the filler is controlled. In particular, in order to obtain a molded article with improved levels of dust generation, which can occur due to dislodgement of the fibrous filler and the resulting generation of resin waste, it is important that the weight average fiber length of the fibrous filler in the molded article is shortened to a value within a prescribed range, such as a length of not more than 400 μm.

In this regard, Patent Document 1 discloses a method of obtaining a molded item by injection molding pellets obtained from a glass fiber-reinforced liquid crystalline resin composition, prepared by filling (A) 100 parts by weight of at least one liquid crystalline resin selected from among liquid crystalline polyester resins which form an anisotropic melt phase and liquid crystalline polyesteramide resins with (B) 5 to 300 parts by weight of glass fibers with an average fiber diameter of 3 to 15 μm and subsequently performing melt-kneading, wherein the weight average fiber length in the pellets is within a range from 0.02 to 0.55 mm, the proportion of glass fibers with a fiber length exceeding 1 mm is from 0 to 15% by weight of the glass fibers, and the proportion of glass fibers with a fiber length of not more than 0.1 mm is from 0 to 50% by weight of the glass fibers. The determination of the flow length during the injection molding and the shrinkage rate of the molded item is also disclosed.

DOCUMENTS OF RELATED ART

Patent Documents

Patent Document 1: JP-H06-240114-A

SUMMARY OF THE INVENTION

Problems to be Solved by the Invention

However, in Patent Document 1, there is no disclosure regarding techniques for adjusting (controlling) the weight average fiber length of the glass fiber in the resin composition to various values within the range of not more than 400 μm without repeating the melt-kneading, and there has been a need for the development of a method for efficiently obtaining a resin composition in which the fiber length of the fiber filler has been controlled in this manner.

The present invention has been developed in light of the above circumstances, and has an object of providing a method of efficiently manufacturing a resin composition in which the weight average fiber length of a constituent fibrous filler is controlled within a range of not more than 400 μm.

Means to Solve the Problems

In order to achieve the above object, the present invention provides a method for producing a resin composition by supplying a resin (A) and a fibrous filler (B), whose weight average fiber length is 1 mm or more to an extruder, performing melt-kneading, and extruding the melt-kneaded material, wherein the extruder has a cylinder and a screw which is disposed inside the cylinder, the cylinder is provided with a main feed port and further optionally provided with a side feed port disposed downstream in the extrusion direction from the main feed port, the resin (A) in the total amount is supplied to the extruder from the main feed port, and the fibrous filler (B) in the total amount is supplied to the extruder from the main feed port, or, with the extruder is provided with the side feed port, the fibrous filler (B) partly is supplied to the extruder from the main feed port and the remainder is supplied to the extruder from the side feed port.

In the method for producing a resin composition of the present invention, the amount of the resin (A) is from 40 to 80% by mass, based on the total supplied amount of the resin (A) and the fibrous filler (B).

In the method for producing a resin composition of the present invention, the resin (A) is preferably a liquid crystalline polyester.

In the method for producing a resin composition of the present invention, the fibrous filler (B) is preferably one or more fibers selected from the group consisting of glass fiber, basalt fiber, alumina fiber and silica alumina fiber.

In other words, the present invention relates to the following.

[1] A method of manufacturing a resin composition using an extruder having a cylinder and a screw which is disposed inside the cylinder, wherein the cylinder is provided with a main feed port and may be additionally provided with a side feed port disposed downstream in an extrusion direction from the main feed port, the method comprising:

supplying all of a resin (A) to the extruder from the main feed port;

supplying all of a fibrous filler (B) having a weight average fiber length of 1 mm or more to the extruder from the main feed port, or if the extruder is provided with the side feed port, supplying part of the fibrous filler (B) to the extruder from the main feed port and supplying the remainder of the fibrous filler (B) to the extruder from the side feed port;

melt-kneading the supplied resin (A) and the fibrous filler (B) to obtain a melt-kneaded material; and extruding the melt-kneaded material.

[2] The method of manufacturing a resin composition according to [1], wherein the amount of the resin (A) is from 40 to 80% by mass, based on a total supply amount of the resin (A) and the fibrous filler (B).

[3] The method of manufacturing a resin composition according to [1] or [2], wherein the resin (A) is a liquid crystalline polyester.

[4] The method of manufacturing a resin composition according to any one of [1] to [3], wherein the fibrous filler (B) is at least one fiber selected from the group consisting of glass fiber, basalt fiber, alumina fiber and silica alumina fiber.

Effects of the Invention

The present invention provides a method of efficiently manufacturing a resin composition in which the weight average fiber length of a constituent fibrous filler is controlled within a range of not more than 400 μm.

BRIEF DESCRIPTION OF THE DRAWINGS

FIG. 1 is a schematic cross-sectional view illustrating an extruder to be used in the method of manufacturing a resin composition according to an embodiment of the present invention.

EMBODIMENT OF THE INVENTION

The method for producing a resin composition according to the present invention is a method for producing a resin composition using an extruder, the extruder having a cylinder and a screw which is disposed in the cylinder, the cylinder being provided with a main feed port and further optionally provided with a side feed port disposed downstream in an extrusion direction from the main feed port, and the method comprising:

supplying a resin (A) in the total amount to the extruder from the main feed port;

supplying a fibrous filler (B), whose weight average fiber length is 1 mm or more, in the total amount to the extruder from the main feed port, or with the extruder being provided with the side feed port, supplying the fibrous filler (B) partly to the extruder from the main feed port and the remainder to the extruder from the side feed port;

melt-kneading the supplied resin (A) and the fibrous filler (B) to obtain a melt-kneaded material; and extruding the melt-kneaded material.

According to the present invention, a resin composition in which the weight average fiber length of the fibrous filler (B) has been controlled within a range of not more than 400 μm can be obtained in a single melt-kneading process, and a resin composition to be used for obtaining a molded article having excellent anti-dust properties can be obtained with good efficiency.

Here, "the weight average fiber length is controlled within a range of not more than 400 μm" means that "the weight average fiber length is adjusted to various values within the range of not more than 400 μm".

Examples of the resin (A) to be used in the method of manufacturing a resin composition according to the present invention include liquid crystalline polyesters, polyphenylene sulfides, polyethersulfones, polyamides and polyimides.

For the resin (A), a single resin may be used alone, or a combination of two or more resins may be used.

The resin (A) is preferably a liquid crystalline polyester. In other words, the resin composition is preferably a liquid crystalline polyester composition.

The liquid crystalline polyester is a polyester that exhibits liquid crystallinity in a melted state, and is preferably a liquid crystalline polyester which melts at a temperature of not more than 450° C. The liquid crystalline polyester may also be a liquid crystalline polyesteramide, a liquid crystalline polyester ether, a liquid crystalline polyester carbonate, or a liquid crystalline polyesterimide. The liquid crystalline polyester is preferably a totally aromatic liquid crystalline polyester prepared using only aromatic compounds as the raw material monomers.

Typical examples of the liquid crystalline polyester include:

(I) liquid crystalline polyesters produced by polymerizing (polycondensing) at least one compound selected from the group consisting of aromatic diols, aromatic hydroxyamines and aromatic diamines, an aromatic hydroxycarboxylic acid, and an aromatic dicarboxylic acid;

(II) liquid crystalline polyesters produced by polymerizing a plurality of aromatic hydroxycarboxylic acids;

(III) liquid crystalline polyesters produced by polymerizing at least one compound selected from the group consisting of aromatic diols, aromatic hydroxyamines and aromatic diamines, and an aromatic dicarboxylic acid; and (IV) liquid crystalline polyesters produced by polymerizing a polyester such as a polyethylene terephthalate, and an aromatic hydroxycarboxylic acid.

Here, each of the aromatic hydroxycarboxylic acid, the aromatic dicarboxylic acid, the aromatic diol, the aromatic hydroxyamine and the aromatic diamine may independently be partially or completely replaced with a polymerizable derivative thereof.

An aromatic hydroxycarboxylic acid is a compound in which two of the hydrogen atoms bonded to an aromatic ring of an aromatic compound are substituted with a hydroxyl group and a carboxyl group respectively.

An aromatic dicarboxylic acid is a compound in which two of the hydrogen atoms bonded to an aromatic ring of an aromatic compound are each substituted with a carboxyl group.

An aromatic diol is a compound in which two of the hydrogen atoms bonded to an aromatic ring of an aromatic compound are each substituted with a hydroxyl group.

An aromatic hydroxyamine is a compound in which two of the hydrogen atoms bonded to an aromatic ring of an aromatic compound are substituted with a hydroxyl group and an amino group respectively.

An aromatic diamine is a compound in which two of the hydrogen atoms bonded to an aromatic ring of an aromatic compound are each substituted with an amino group.

Examples of the aromatic compound include benzene, naphthalene and biphenyl.

Examples of polymerizable derivatives of a compound having a carboxyl group, such as an aromatic hydroxycarboxylic acid or an aromatic dicarboxylic acid, include esters in which the carboxyl group is substituted with an alkoxycarbonyl group or an aryloxycarbonyl group, acid halides in which the carboxyl group is substituted with a haloformyl group, and acid anhydrides in which the carboxyl group is substituted with an acyloxycarbonyl group.

Examples of polymerizable derivatives of a compound having a hydroxyl group, such as an aromatic hydroxycarboxylic acid, an aromatic diol or an aromatic hydroxyamine, include acyloxylated compounds in which the hydroxyl group is acylated and substituted with an acyloxyl group.

Examples of polymerizable derivatives of a compound having an amino group, such as an aromatic hydroxyamine or an aromatic diamine, include acylaminated compounds in which the amino group is acylated and substituted with an acylamino group.

The resin (A), such as a liquid crystalline polyester, preferably has a repeating unit represented by general formula (1) shown below (hereinafter sometimes referred to as "repeating unit (1)"); and more preferably has the repeating unit (1), a repeating unit represented by general formula (2) shown below (hereinafter sometimes referred to as "repeating unit (2)"), and a repeating unit represented by general formula (3) shown below (hereinafter sometimes referred to as "repeating unit (3)").

$$-O-Ar^1-CO- \qquad (1)$$

$$-CO-Ar^2-CO- \qquad (2)$$

$$-X-Ar^3-Y- \qquad (3)$$

In the formulas, $Ar^1$ represents a phenylene group, naphthylene group or biphenylylene group; each of $Ar^2$ and $Ar^3$ independently represents a phenylene group, naphthylene group, biphenylylene group or a group represented by general formula (4) shown below; each of X and Y independently represents an oxygen atom or an imino group; and one or more hydrogen atoms in $Ar^1$, $Ar^2$ and $Ar^3$ may each be independently substituted with a halogen atom, an alkyl group or an aryl group.

$$-Ar^4-Z-Ar^5- \qquad (4)$$

In the formula, each of $Ar^4$ and $Ar^5$ independently represents a phenylene group or a naphthylene group; and Z represents an oxygen atom, sulfur atom, carbonyl group, sulfonyl group or alkylidene group.

Examples of the halogen atoms which may substitute a hydrogen atom in $Ar^1$, $Ar^2$ or $Ar^3$ include a fluorine atom, chlorine atom, bromine atom and iodine atom.

The alkyl group which may substitute a hydrogen atom in $Ar^1$, $Ar^2$ or $Ar^3$ preferably has a carbon number of 1 to 10, and examples include a methyl group, ethyl group, n-propyl group, isopropyl group, n-butyl group, isobutyl group, sec-butyl group, tert-butyl group, n-pentyl group, n-hexyl group, n-heptyl group, 2-ethylhexyl group, n-octyl group, n-nonyl group and n-decyl group. The aryl group which may substitute a hydrogen atom in $Ar^1$, $Ar^2$ or $Ar^3$ preferably has a carbon number of 6 to 20, and examples include a phenyl group, o-tolyl group, m-tolyl group, p-tolyl group, 1-naphthyl group and 2-naphthyl group.

When hydrogen atoms are substituted with one of these groups, the number of hydrogen atoms substituted, for each group represented by $Ar^1$, $Ar^2$ or $Ar^3$, is preferably not more than 2 in each case, and is more preferably 1.

The alkylidene group for Z preferably has a carbon number of 1 to 10, and examples include a methylene group, ethylidene group, isopropylidene group, n-butylidene group and 2-ethylhexylidene group.

The repeating unit (1) is a repeating unit derived from a specific aromatic hydroxycarboxylic acid. The repeating unit (1) is preferably a repeating unit in which $Ar^1$ represents a 1,4-phenylene group (a repeating unit derived from p-hydroxybenzoic acid) or a repeating unit in which $Ar^1$ represents a 2,6-naphthylene group (a repeating unit derived from 6-hydroxy-2-naphthoic acid).

The repeating unit (2) is a repeating unit derived from a specific aromatic dicarboxylic acid. The repeating unit (2) is preferably a repeating unit in which $Ar^2$ represents a 1,4-phenylene group (a repeating unit derived from terephthalic acid), a repeating unit in which $Ar^2$ represents a 1,3-phenylene group (a repeating unit derived from isophthalic acid), a repeating unit in which $Ar^2$ represents a 2,6-naphthylene group (a repeating unit derived from 2,6-naphthalenedicarboxylic acid), or a repeating unit in which $Ar^2$ represents a diphenyl ether-4,4'-diyl group (a repeating unit derived from diphenyl ether-4,4'-dicarboxylic acid).

The repeating unit (3) is a repeating unit derived from a specific aromatic diol, aromatic hydroxyamine or aromatic diamine. The repeating unit (3) is preferably a repeating unit in which $Ar^3$ represents a 1,4-phenylene group (a repeating unit derived from hydroquinone, p-aminophenol or p-phenylenediamine) or a repeating unit in which $Ar^3$ represents a 4,4'-biphenylylene group (a repeating unit derived from 4,4'-dihydroxybiphenyl, 4-amino-4'-hydroxybiphenyl or 4,4'-diaminobiphenyl).

The amount of the repeating unit (1) with respect to the total amount of all the repeating units that constitute the resin (A) such as a liquid crystalline polyester (the value obtained by determining the substance-equivalent amount (mol) of each repeating unit by dividing the mass of each repeating unit that constitutes the resin (A) such as a liquid crystalline polyester by the formula weight of the repeating unit, and then totaling these substance-equivalent amounts) is preferably at least 30 mol %, more preferably 30 to 80 mol %, still more preferably 40 to 70 mol %, and particularly preferably 45 to 65 mol %.

The amount of the repeating unit (2) with respect to the total amount of all the repeating units that constitute the resin (A) such as a liquid crystalline polyester is preferably not more than 35 mol %, more preferably 10 to 35 mol %, still more preferably 15 to 30 mol %, and particularly preferably 17.5 to 27.5 mol %.

The amount of the repeating unit (3) with respect to the total amount of all the repeating units that constitute the resin (A) such as a liquid crystalline polyester is preferably not more than 35 mol %, more preferably 10 to 35 mol %, still more preferably 15 to 30 mol %, and particularly preferably 17.5 to 27.5 mol %.

The larger the amount of the repeating unit (1), the more easily the melt fluidity, the heat resistance, and the strength and rigidity of the resin (A) such as a liquid crystalline polyester can be improved, but if the amount of the repeating unit (1) is too large, then the melting temperature and the melt viscosity of the liquid crystalline polyester tend to increase, and the temperature required for molding tends to increase.

The ratio between the amount of the repeating unit (2) and the amount of the repeating unit (3) is represented by [amount of repeating unit (2)]/[amount of repeating unit (3)] (mol/mol), and is preferably from 0.9/1 to 1/0.9, more preferably from 0.95/1 to 1/0.95, and still more preferably from 0.98/1 to 1/0.98.

The resin (A) such as a liquid crystalline polyester may have the repeating units (1) to (3) each independently in two or more. Further, the resin (A) such as a liquid crystalline polyester may also include repeating units other than the repeating units (1) to (3), but the amount of these other repeating units with respect to the total amount of all the repeating units that constitute the resin (A) such as a liquid crystalline polyester is preferably not more than 10 mol %, and more preferably 5 mol % or less.

The resin (A) such as a liquid crystalline polyester preferably has, as the repeating unit (3), a repeating unit in which X and Y are both oxygen atoms, namely a repeating unit derived from a specific aromatic diol, and more preferably has only repeating units in which X and Y are both oxygen atoms as the repeating unit (3). This tends to facilitate lowering of the melt viscosity of the resin (A) such as the liquid crystalline polyester.

The resin (A) such as a liquid crystalline polyester is preferably manufactured by melt polymerizing the raw material monomers corresponding with the repeating units that constitute the resin, and then subjecting the obtained polymer (prepolymer) to solid phase polymerization. This enables it to manufacture with good operability a high-molecular weight resin (A) such as a liquid crystalline polyester with high levels of heat resistance, strength and rigidity. The melt polymerization may be performed in the presence of a catalyst, and in such a case, examples of the catalyst include metallic compounds such as magnesium acetate, stannous acetate, tetrabutyl titanate, lead acetate, sodium acetate, potassium acetate and antimony trioxide, and nitrogen-containing heterocyclic compounds such as 4-(dimethylamino)pyridine and 1-methylimidazole. A nitrogen-containing heterocyclic compound is preferably used.

The resin (A) such as a liquid crystalline polyester supplied to the extruder has a flow starting temperature that is preferably at least 270° C., more preferably 270° C. to 400° C., and still more preferably 280° C. to 380° C. The higher the flow starting temperature, the more easily the heat resistance and the strength and rigidity can be increased, but if the flow starting temperature is too high, it is likely to increase the melting temperature or the melt viscosity, and increase the temperature required for molding.

The "flow starting temperature", also termed the "flow temperature", means such temperature that the viscosity is 4,800 Pa·s (48,000 poise) when the liquid crystalline polyester is melted by heating at a rate of 4° C./minute under a load of 9.8 MPa (100 kg/cm$^2$) using a capillary rheometer, and extruded from a nozzle being 1 mm in its inner diameter and 10 mm in its length, which provides an indication of the molecular weight of the liquid crystalline polyester (see Naoyuki Koide (ed.), "Liquid Crystalline Polymers—Synthesis, Molding, Applications—", CMC Publishing Co., Ltd., Jun. 5, 1987, p. 95).

When a liquid crystalline polyester is used as the resin (A), a resin (A) other than the liquid crystalline polyester may be used in combination with the liquid crystalline polyester, including polyesters other than liquid crystalline polyesters, such as polypropylenes and polyamides; thermoplastic resins other than liquid crystalline polyesters, such as polysulfones, polyphenylene sulfides, polyetherketones, polycarbonates, polyphenylene ethers and polyetherimides; and thermosetting resins such as phenol resins, epoxy resins, polyimide resins, and cyanate resins.

The amount supplied of the resin other than the liquid crystalline polyester is preferably from 0 to 99 parts by mass per 100 parts by mass of the liquid crystalline polyester.

The fibrous filler (B) in the method of manufacturing a resin composition according to the present invention may be an inorganic filler or an organic filler.

In the present invention, "fiber" means a narrow thread-like substance in which the cross-sectional shape is circular, elliptical or polygonal, and the length is at least 2 times the maximum diameter of the cross-sectional shape.

Examples of fiber inorganic fillers include ceramic fibers such as glass fiber, basalt fiber, silica fiber, carbon fiber, alumina fiber and silica alumina fiber. Further examples include whiskers such as potassium titanate whiskers, barium titanate whiskers and wollastonite whiskers.

Examples of fiber organic fillers include polyester fiber and aramid fiber.

For the fibrous filler (B), a single type of filler may be used alone, or a combination of two or more types of filler may be used.

The fibrous filler (B) is preferably a ceramic fiber, more preferably one or more types of fiber selected from the group consisting of glass fiber, basalt fiber, alumina fiber and silica alumina fiber, and in terms of availability and the abrasive load applied to the apparatus during molding processing, is still more preferably a glass fiber.

The fibrous filler (B) may be a fibrous filler which has been subjected to a surface coating treatment with a surface coating agent or a coupling agent such as a titanium coupling agent, or a surface coating treatment with any of various thermosetting resins or thermoplastic resins. By using this type of fibrous filler (B), the amount of gas generated from the molded article described below can be better reduced, the chemical stability of the molded article can be improved, and when an electrical or electronic device or an optical device is assembled, contamination of nearby components due to gas generated from the molded article can be reduced.

Further, among the various possibilities for the fibrous filler (B), the glass fiber may be treated with an epoxy-based, urethane-based or acrylic-based coating agent or sizing agent.

The weight average fiber length of the fibrous filler (B) is 1 mm or more, preferably 1 to 10 mm, and more preferably 1 to 6 mm.

The fibrous filler (B) is preferably composed of uniformly chopped strands in which there is no distribution in the fiber length.

The average fiber diameter of the fibrous filler (B) may be similar to typical manufactured products, and is preferably from 3 to 15 µm. When the average fiber diameter is 3 µm or more, the reinforcing effect on the molded article improves. Further, when the average fiber diameter is not more than 15 µm, the moldability improves, and the external appearance of the surface of the molded article is more favorable.

In the present invention, besides the resin (A) and the fibrous filler (B), other components, such as the fillers other than the fibrous filler (B) and additives, may also be supplied to the extruder to manufacture the resin composition.

For these other components, one component may be used alone, or a combination of two or more components may be used.

Examples of the other fillers include talc, mica, graphite, glass flakes, barium sulfate, silica, alumina, titanium oxide, glass beads, glass balloons, boron nitride, silicon carbide and calcium carbonate. The amount supplied of these other fillers is preferably from 0 to 100 parts by mass per 100 parts by mass of the liquid crystalline polyester.

Examples of the additives include antioxidants, heat stabilizers, ultraviolet absorbers, antistatic agents, surfactants, flame retardants and colorants.

The amount supplied of such additives is preferably from 0 to 5 parts by mass per 100 parts by mass of the liquid crystalline polyester.

In the method of manufacturing a resin composition of the present invention, the resin composition is manufactured by supplying, to an extruder, the resin (A), the fibrous filler (B) and any other components to be used as necessary, performing melt-kneading, and then extruding the kneaded material. Further, in the method of manufacturing a resin composition of the present invention, following extrusion of the kneaded material, the material is preferably converted to a pelletized resin composition.

In the above manufacturing method, the cylinder temperature is preferably 250° C. or more but not more than 450° C., and is more preferably 300° C. or more but not more than 400° C.

In the method of manufacturing a resin composition of the present invention, the extruder has a cylinder and one or more screws disposed inside the cylinder, which extruder is preferably provided with feed (supply) ports in two or more locations in the cylinder, and more preferably further provided with vents in one or more locations in the cylinder. The cylinder is preferably provided with a main feed port and a side feed port which is disposed downstream in the extrusion direction from the main feed port.

Further, the extruder may be provided with a heater for heating the inside of the cylinder.

The amount of the resin (A), based on the total supplied amount of the resin (A) and the fibrous filler (B), is preferably from 40 to 80% by mass, and more preferably from 50 to 70% by mass. By setting it to the lower limit or more, the fluidity of the resin composition improves, and molding can be performed more easily. Further, by setting it to the upper limit or less, the reinforcing effect due to the fibrous filler (B) improves, and the rigidity of the molded article improves.

FIG. 1 is a schematic cross-sectional view illustrating an extruder to be used in the method of manufacturing a resin composition according to an embodiment of the present invention.

The extruder 10 shown in FIG. 1 is provided with a motor 1 housed in a motor box 1a, a cylinder 2 provided adjacent to the motor box 1a, and a screw 3 which is inserted inside the cylinder 2 and connected to the motor 1. The extruder 10 is a twin screw extruder in which two screws 3 are disposed inside the cylinder 2.

The cylinder 2 is provided with a main feed port 5 for supplying components such as the resin (A) (hereinafter, the components are sometimes referred to collectively as "raw material components") into the cylinder 2, a side feed port 7 for supplying a portion of the raw material components into the cylinder 2 as required, from a position downstream (afterward) in the extrusion direction from the main feed port 5, a first vent 4 and a second vent 6 for discharging volatile components (gas) generated inside the cylinder 2, and a discharge die 9 which molds the kneaded material obtained by melt-kneading.

In the cylinder 2, the main feed port 5 is provided in the most upstream position in the extrusion direction (the position closest to the motor box 1); the side feed port 7, the first vent 4 and the second vent 6 are provided in sequence downstream from the main feed port 5 in the extrusion direction (namely, in the direction of the extrusion, toward the discharge die 9); and the discharge die 9 which has a nozzle hole 9a that is interconnected with the cylinder 2 is provided at the downstream end of the cylinder 2 in the extrusion direction.

The main feed port 5 and the side feed port 7 are each provided with a hopper that is connected to the interior of the cylinder 2, and a supply device which supplies a fixed mass or a fixed volume of a raw material component. Examples of the supply system of the supply devices include a belt system, screw system, oscillating system and table system.

The first vent 4 and the second vent 6 may be open vent systems that are open to the atmosphere, or vacuum vent systems which are connected to a water seal pump, rotary pump, oil diffusion pump or turbo pump, and are held under vacuum.

A transport section 8 for transporting the raw material components or the kneaded material is provided on the screw 3. Further, a first kneading section 11 for performing plasticization and kneading of the raw material components or the kneaded material is provided on the screw 3 between the main feed port 5 and the side feed port 7; a second kneading section 12 for performing plasticization and kneading of the raw material components or the kneaded material is provided on the screw 3 between the side feed port 7 and the first vent 4; and in addition to the first vent 4 and the second vent 6, a fourth kneading section and a fifth kneading section (not shown in the FIGURE), different from a third kneading section 13 described below, may be provided. In this case, the temperature of the cylinder is preferably carefully controlled in order to suppress shear heating.

This type of screw 3 is constructed by assembling screw elements. The transport section 8 is a forward flight (full flight) screw element; and the first kneading section 11, the second kneading section 12 and the third kneading section 13 are generally composed of a combination of screw elements such as a full flight, reverse flight, seal ring, forward kneading disc, neutral kneading disc, and reverse kneading disc.

The first kneading section 11, the second kneading section 12 and the third kneading section 13 preferably each use a first element 11a, 12a, 13a having a configuration in which kneading discs are superposed while being staggered at a phase angle exceeding 0 degrees but less than 90 degrees, and a second element 11b, 12b, 13b which is a neutral kneading element (a configuration in which kneading discs are superposed while being staggered at a phase angle of 90 degrees).

When an additional kneading section is provided downstream in the extrusion direction from the third kneading section 13 of the screw 3, it is preferable that a neutral kneading element is used for the kneading section located at the most downstream position, and that an element having a configuration in which kneading discs are superposed while being staggered at a phase angle exceeding 0 degrees but less than 90 degrees, and a neutral kneading element are used for the kneading sections other than the most downstream kneading section. For example, when a fourth kneading section and a fifth kneading section are also provided at the first vent 4 and the second vent 6, it is preferable that an element having a configuration in which kneading discs are superposed while being staggered at a phase angle exceeding 0 degrees but less than 90 degrees, and a neutral kneading element are used as the elements for the first to fourth kneading sections, and that a neutral kneading element is used as the element for the fifth kneading section.

Any screw elements may be used as the other elements that constitute the screw 3, provided they do not impair the overall capability of the screw to transport the melted kneaded material.

The extruder used in the present invention is not limited to the twin screw extruder illustrated in FIG. 1, and a short screw extruder may also be used.

Examples of the twin screw extruder include co-rotating single-thread to triple-thread twin screw extruders, and counter-rotating parallel axis type, inclined axis type or incomplete engagement type twin screw extruders, and a co-rotating twin screw extruder is preferred.

In the present invention, the resin (A) in the total amount is supplied to the extruder from the main feed port, regardless of the presence or absence of an extruder side feed port. Then, the fibrous filler (B) in the total amount is supplied to the extruder from the main feed port, regardless of the presence or absence of an extruder side feed port; or with the extruder being provided with a side feed port, the fibrous filler (B) is partly supplied to the extruder from the main feed port, and the remainder (namely, the amount obtained by subtracting the amount supplied from the main feed port from the total amount of the fibrous filler (B)) is supplied to the extruder from the side feed port. In this manner, by supplying at least partly the fibrous filler (B) to the extruder from the main feed port, a resin composition in which the weight average fiber length of the fibrous filler (B) is controlled within a range of not more than 400 μm can be obtained in a single melt-kneading, specifically without supplying more than once the resin composition obtained by melt-kneading to the extruder for kneading.

Furthermore, in the present invention, when the fibrous filler (B) is partly supplied to the extruder from the main feed port and the remainder is supplied to the extruder from the side feed port, by adjusting the ratio between the supplied amount of the fibrous filler (B) from the main feed port and the supplied amount of the fibrous filler (B) from the side feed port, the weight average fiber length and the number average fiber length of the fibrous filler (B) can be adjusted. Usually, by increasing the supplied amount from the main feed port, the weight average fiber length and the number average fiber length of the fibrous filler (B) can be shortened.

The ratio between the supplied amount of the fibrous filler (B) from the main feed port and the supplied amount of the fibrous filler (B) from the side feed port is preferably from 1:4 to 1:0, more preferably from 1:1 to 1:0, and still more preferably 1:0.

In the present invention, two or more components selected from the group consisting of the resin (A), the fibrous filler (B) and any other components that are used according to need may be mixed together in advance, with the resulting mixture then supplied to the extruder from the main feed port (but at this time, other components may be supplied without mixing), or all of the components may be supplied separately to the extruder from the main feed port. Further, when the fibrous filler (B) and other components are supplied to the extruder from the side feed port, these components may be mixed together in advance, with the resulting mixture then supplied to the extruder from the side feed port, or the components may be supplied separately to the extruder from the side feed port.

The fibrous filler (B) in the resin composition obtained by extruding the kneaded material has a weight average fiber length that is preferably not more than 400 μm, more preferably from 80 to 400 μm, and still more preferably from 100 to 370 μm.

Further, the number average fiber length is preferably from 80 to 250 μm, and more preferably from 80 to 230 μm.

By setting the weight average fiber length and the number average fiber length respectively to their respective upper limits or less, the fluidity of the resin composition improves, and molding can be performed more easily. Further, the external appearance of the surface of the molded article is more favorable, and the dust generation caused by the fibrous filler (B) being dislodged or generating resin wastes due to it is improved (namely, the anti-dust properties improve). Further, when the weight average fiber length and the number average fiber length are respectively set to their lower limits or more, the reinforcing effect due to the fibrous filler (B) improves, the rigidity of the molded article improves, and the anisotropy decreases.

The "weight average fiber length" and the "number average fiber length" of the fibrous filler can be determined, for example, by placing 1.0 g of the resin composition in a crucible, ashing the composition by treatment in an electric furnace at 600° C. for 4 hours, dispersing the residue in methanol, taking a microscope photograph with the dispersion spread on a slide glass, using a magnifier (such as an optical microscope or an electron microscope) to detect the shape of 400 or more fibers of the filler from the photograph, and then calculating the average value for the fiber length.

The resin composition is ideal for manufacturing various molded articles.

The molding method for the resin composition is preferably a melt molding method, examples of which include extrusion molding methods such as an injection molding method, T-die method or inflation method, compression molding methods, blow molding methods, vacuum molding methods, and press molding methods, and preferably an injection molding method.

Examples of the molded article include electrical and electronic components and optical components, and specific examples include components associated with semiconductor manufacturing processes, such as connectors, sockets, relay components, coil bobbins, optical pickups, oscillators, printed wiring boards, circuit boards, semiconductor packages, computer-related components, camera lens tubes, optical sensor housings, compact camera module housings (packages and lens tubes), components of projector optical engines, IC trays, and wafer carriers; components for household electrical appliances such as VTRs, televisions, irons, air conditioners, stereos, vacuum cleaners, refrigerators, rice cookers, and lighting equipment; lighting equipment components such as lamp reflectors and lamp holders; components for acoustic products such as compact discs, laser discs (a registered trademark), and speakers; and communication equipment components such as ferrules for optical cables, telephone components, facsimile components, and modems.

Additional examples other than those listed above include components associated with copying machines and printers, such as separating claws and heater holders; machine components such as impellers, fan gears, gears, bearings, motor components and cases; automobile components such as mechanism components for automobiles, engine components, engine room components, electrical components, and interior components; cooking equipment such as microwave cooking pans and heat-resistant tableware; construction materials or civil engineering and construction materials, including insulation or soundproofing materials such as flooring materials and wall materials, support materials such as beams and posts, and roofing materials; components for aircraft, spacecraft and space equipment; members for radiation facilities such as nuclear reactors; members for marine facilities; cleaning jigs; components for optical instruments; valves; pipes; nozzles; filters; films; medical equipment components and medical materials; components for sensors; sanitary items; sporting goods; and leisure goods.

By ensuring that the weight average fiber length of the fibrous filler (B) in the resin composition is not more than 400 μm, a molded article obtained using the resin composition described above not only exhibits excellent moldability and favorable surface appearance, but also has excellent anti-dust properties.

EXAMPLES

The present invention is described below in further detail using a series of examples. However, the present invention is in no way limited by the examples presented below. The flow starting temperature of the liquid crystalline polyesters, and the weight average fiber length and number average fiber length of fibrous fillers in the liquid crystalline polyester compositions were measured using the following methods.

(Measurement of Flow Starting Temperature of Liquid Crystalline Polyester Supplied to Extruder)

Using a flow tester (CFT-500 model, manufactured by Shimadzu Corporation), approximately 2 g of the liquid crystalline polyester was packed in a cylinder fitted with a die having a nozzle with its inner diameter of 1 mm and its length of 10 mm, the liquid crystalline polyester was melted by heating at a rate of 4° C./minute under the load of 9.8 MPa (100 kg/cm$^2$), and was then extruded from the nozzle, and the temperature at which the viscosity was 4,800 Pa·s (48,000 poise) was measured.

(Measurement of Weight Average Fiber Length and Number Average Fiber Length of Fibrous Filler in Liquid Crystalline Polyester Composition)

1.0 g of the liquid crystalline polyester composition was placed in a crucible, the composition was ashed by treatment in an electric furnace at 600° C. for 4 hours, the residue was dispersed in methanol, a microscope photograph was taken with the dispersion spread on a slide glass, the shape of the fibrous filler (glass fiber) was read directly from the photograph, and the average value of the fiber length was calculated. When calculating the average value, a sample size of 400 or more was used. For each weight, the weight for each fiber length was calculated using the specific gravity of the fibrous filler, and the total weight of the sample used was used in calculating the average value.

Manufacture of Liquid Crystalline Polyester

Production Example 1

A reactor fitted with a stirrer, a torque meter, a nitrogen gas inlet, a thermometer and a reflex condenser was charged with 994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, 1347.6 g (13.2 mol) of acetic anhydride, and 0.194 g of 1-methylimidazole. Then, after replacing by nitrogen gas within the inside of the reactor, the temperature inside the reactor was raised from room temperature to 145° C. over 15 minutes, under stirring and under a nitrogen gas flow, and refluxing was then performed for one hour at this temperature (145° C.).

Subsequently, 0.194 g of 1-methylimidazole was added thereto, the temperature was then raised from 145° C. to 320° C. over 3 hours while by-product acetic acid and unreacted acetic anhydride were removed by distillation, and the temperature of 320° C. was then maintained for 2 hours. The contents were then removed from the reactor and cooled to room temperature, and the resulting solid was crushed with a crusher, yielding a powdered prepolymer. The flow starting temperature of this prepolymer was 261° C.

Subsequently, this prepolymer was heated from room temperature to 250° C. over one hour under a nitrogen gas atmosphere, and the temperature was then raised from 250° C. to 285° C. over 5 hours and held at 285° C. for 3 hours to effect a solid phase polymerization. The reaction mixture was then cooled, yielding a powdered liquid crystalline polyester. The flow starting temperature of this liquid crystalline polyester was 327° C. The liquid crystalline polyester obtained in this manner was termed LCP1.

Manufacture of Liquid Crystalline Polyester Compositions

Examples 1 to 5, Comparative Example 1

The LCP1 obtained in Production Example 1 and a glass fiber (CS-3J-260S, manufactured by Nitto Boseki Co., Ltd., weight average fiber length: 3 mm) were supplied separately to a twin screw extruder (TEM-41 SS, manufactured by Toshiba Machine Co., Ltd.) in the respective supplied amounts (parts by mass) shown in Table 1. At this time, all (the total amount) of the LCP1 was supplied from the main feed port, and the glass fiber was supplied from the main feed port and/or the side feed port in the amounts (parts by mass) shown in Table 1. Melt-kneading was performed with the cylinder temperature set to 340° C., the kneaded material was extruded in a strand, and the strand was cut to obtain pellets of the liquid crystalline polyester compositions. The twin screw extruder used had the configuration illustrated in FIG. 1. The weight average fiber length and the number average fiber length of the glass fiber in the obtained pellets were calculated. The results are shown in Table 2.

TABLE 1

| | Supplied component (parts by mass) | | Supplied amount of Glass fiber (parts by mass) (main feed port/side feed port) |
|---|---|---|---|
| | LCP1 | Glass fiber | |
| Example 1 | 60 | 40 | 10/30 |
| Example 2 | 60 | 40 | 20/20 |
| Example 3 | 60 | 40 | 40/0 |
| Example 4 | 55 | 45 | 45/0 |
| Example 5 | 65 | 35 | 35/0 |
| Comparative Example 1 | 60 | 40 | 0/40 |

TABLE 2

| | Weight average fiber length (μm) | Number average fiber length (μm) |
|---|---|---|
| Example 1 | 330 | 204 |
| Example 2 | 311 | 174 |
| Example 3 | 150 | 110 |
| Example 4 | 158 | 113 |
| Example 5 | 160 | 115 |
| Comparative Example 1 | 408 | 296 |

As apparent from the above results, in Examples 1 to 5, by satisfying the requirements of the present invention, liquid crystalline polyester compositions in which the weight average fiber length of the glass fiber was controlled within a range of not more than 400 μm and the number average fiber length was controlled within a range of not more than 250 μm were obtained using a single melt-kneading process. Specifically, as apparent from the results of Examples 1 to 3, the weight average fiber length and the number average fiber length were adjusted by adjusting the ratio between the supplied amount of the glass fiber from the main feed port and the supplied amount of the glass fiber from the side feed port, and by increasing the supplied amount from the main feed port, the weight average fiber length and the number average fiber length were shortened.

In contrast, in Comparative Example 1, a liquid crystalline polyester composition in which the weight average fiber length of the glass fiber had been shortened to not more than 400 μm and the number average fiber length had been shortened to not more than 250 μm was not obtained in a single melt-kneading process.

INDUSTRIAL APPLICABILITY

The present invention can be used for manufacturing various molded articles that require favorable anti-dust properties, including electrical and electronic components and optical components, and is therefore extremely useful in industry.

DESCRIPTION OF THE REFERENCE SIGNS

1: Motor
1a: Motor box
2: Cylinder
3: Screw
4: First vent
5: Main feed port
6: Second vent
7: Side feed port
8: Transport section
9: Discharge die
9a: Nozzle hole
10: Extruder
11: First kneading section
12: Second kneading section
13: Third kneading section

The invention claimed is:

1. A method for producing a resin composition comprising:
   providing an extruder comprising:
   a cylinder having a main feed port and a side feed port downstream from the main feed port in an extrusion direction,
   a screw disposed inside the cylinder, and
   at least three kneading sections constructed by (i) a first element having kneading discs which are superposed and staggered at a phase angle greater than 0 degrees and less than 90 degrees and (ii) a second element which is a neutral kneading element,
   supplying a resin (A) to the extruder from the main feed port;
   supplying a fibrous filler (B) having a weight average fiber length of 1 mm or more to the extruder, a ratio of an amount of the fibrous filler (B) supplied from the main feed port and an amount of fibrous filler (B) supplied from the side feed port being from 1:4 to 1:0;
   melt-kneading the supplied resin (A) and the fibrous filler (B) to obtain a melt-kneaded material; and
   extruding the melt-kneaded material.

2. The method for producing a resin composition according to claim 1, wherein the amount of the resin (A) is 40 to 80% by mass, based on the total supplied amount of the resin (A) and the fibrous filler (B).

3. The method for producing a resin composition according to claim 1, wherein the resin (A) is a liquid crystalline polyester.

4. The method for producing a resin composition according to claim 1, wherein the fibrous filler (B) is one or more fibers selected from the group consisting of glass fiber, basalt fiber, alumina fiber and silica alumina fiber.

* * * * *